US011073285B2

(12) United States Patent
Quach et al.

(10) Patent No.: US 11,073,285 B2
(45) Date of Patent: Jul. 27, 2021

(54) COMBUSTOR PANEL CONFIGURATION WITH SKEWED SIDE WALLS (71) Applicant: United Technologies Corporation, Farmington, CT (US)

(72) Inventors: San Quach, Southington, CT (US); Jeremy Styborski, East Hartford, CT (US); Caroline Karanian, West Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 112 days.

(21) Appl. No.: 16/448,414

(22) Filed: Jun. 21, 2019

(65) Prior Publication Data
US 2020/0400313 A1 Dec. 24, 2020

(51) Int. Cl.
F23R 3/00 (2006.01)
F23R 3/06 (2006.01)
F23R 3/50 (2006.01)

(52) U.S. Cl.
CPC .............. F23R 3/06 (2013.01); F23R 3/002 (2013.01); F23R 3/50 (2013.01)

(58) Field of Classification Search
CPC .... F23R 3/06; F23R 3/002; F23R 3/50; F23R 2900/03044
See application file for complete search history.

(56) References Cited

U.S. PATENT DOCUMENTS

| 5,226,278 A | 7/1993 | Meylan et al. |
| 2009/0077974 A1* | 3/2009 | Dahlke ................. F23M 5/085 60/752 |
| 2016/0265771 A1 | 9/2016 | Max et al. |
| 2017/0176005 A1 | 6/2017 | Rimmer et al. |
| 2017/0241643 A1 | 8/2017 | Mulcaire et al. |
| 2018/0128486 A1* | 5/2018 | Burd ....................... F23R 3/002 |

FOREIGN PATENT DOCUMENTS

| EP | 1098141 A1 | 5/2001 |
| EP | 3054218 A1 | 8/2016 |
| EP | 3321587 A1 | 5/2018 |
| WO | 2015074052 A1 | 5/2015 |

OTHER PUBLICATIONS

The extended European Search Report for Application No. 20180194. 1-1009; dated Oct. 12, 2020; Report Received Date: Oct. 22, 2020; 6 pages.

* cited by examiner

Primary Examiner — Steven M Sutherland
(74) Attorney, Agent, or Firm — Cantor Colburn LLP (57) ABSTRACT A combustor of a gas turbine engine including a first forward liner panel. The forward liner panel including a liner panel forward edge, a liner panel aft edge opposite of the liner panel forward edge, and a first liner panel side edge between the liner panel aft edge and the liner panel forward edge. The first liner panel side edge is non-perpendicular to the liner panel forward edge and oriented at an angle about perpendicular to a swirl flow in the combustor.

16 Claims, 11 Drawing Sheets

COMBUSTOR PANEL CONFIGURATION WITH SKEWED SIDE WALLS

BACKGROUND

The subject matter disclosed herein generally relates to gas turbine engines and, more particularly, to a method and apparatus for mitigating heat shield panels used in combustors of gas turbine engines.

In one example, a combustor of a gas turbine engine may be configured to burn fuel in a combustion area. Such configurations may place substantial heat load on the structure of the combustor (e.g., heat shield panels, shells, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields panels.

SUMMARY

According to an embodiment, a combustor of a gas turbine engine is provided. The combustor including a first forward liner panel. The forward liner panel including a liner panel forward edge, a liner panel aft edge opposite of the liner panel forward edge, and a first liner panel side edge between the liner panel aft edge and the liner panel forward edge. The first liner panel side edge is non-perpendicular to the liner panel forward edge and oriented at an angle about perpendicular to a swirl flow in the combustor.

In addition to one or more of the features described above, or as an alternative, further embodiments may include that the first forward liner panel further includes a second liner panel side edge between the liner panel aft edge and the liner panel forward edge. The second liner panel side edge being about parallel to the first liner panel side edge. The second liner panel side edge is non-perpendicular to the liner panel forward edge and oriented at an angle about perpendicular to the swirl flow in the combustor.

In addition to one or more of the features described above, or as an alternative, further embodiments may include that the liner panel forward edge and the liner panel aft edge are parallel.

In addition to one or more of the features described above, or as an alternative, further embodiments may include a second forward liner panel circumferentially adjacent to the first forward liner panel. The first forward liner panel and the second forward liner panel being in a spaced relationship forming a gap therebetween.

In addition to one or more of the features described above, or as an alternative, further embodiments may include that the first forward liner panel is offset from the second forward liner panel to direct cooling airflow from a cavity of the first forward liner panel to a hot side of the second forward liner panel.

In addition to one or more of the features described above, or as an alternative, further embodiments may include a second forward liner panel circumferentially adjacent to the first forward liner panel. The first forward liner panel and the second forward liner panel being in a spaced relationship forming a gap therebetween.

In addition to one or more of the features described above, or as an alternative, further embodiments may include that the second forward liner panel further includes a liner panel forward edge, a liner panel aft edge opposite of the liner panel forward edge of the second forward liner panel, and a first liner panel side edge between the liner panel aft edge of the second forward liner panel and the liner panel forward edge of the second forward liner panel. The first liner panel side edge of the second forward liner panel is non-perpendicular to the liner panel forward edge of the second forward liner panel and oriented at an angle about perpendicular to the swirl flow in the combustor. The second forward liner panel further includes a second liner panel side edge between the liner panel aft edge of the second forward liner panel and the liner panel forward edge of the second forward liner panel. The second liner panel side edge of the second forward liner panel being about parallel to the first liner panel side edge of the second forward liner panel. The second liner panel side edge of the second forward liner panel is non-perpendicular to the liner panel forward edge of the second forward liner panel and oriented at an angle about perpendicular to the swirl flow in the combustor.

In addition to one or more of the features described above, or as an alternative, further embodiments may include that the first liner panel side edge of the first forward liner panel is offset from the second liner panel side edge of the second forward liner panel to direct cooling airflow from the cavity of the first forward liner panel to a hot side of the second forward liner panel.

In addition to one or more of the features described above, or as an alternative, further embodiments may include that the first liner panel side edge of the first forward liner panel is in a facing spaced relationship with the second liner panel side edge of the second forward liner panel defining the gap therebetween.

In addition to one or more of the features described above, or as an alternative, further embodiments may include that at least one of the first liner panel side edge of the first forward liner panel and the second liner panel side edge of the second forward liner panel is operably shaped to direct cooling airflow from a cavity of the first forward liner panel to a hot side of the second forward liner panel.

In addition to one or more of the features described above, or as an alternative, further embodiments may include that the first liner panel side edge of the first forward liner panel is operably shaped to direct cooling airflow from a cavity of the first forward liner panel to a hot side of the second forward liner panel.

In addition to one or more of the features described above, or as an alternative, further embodiments may include that the second liner panel side edge of the second forward liner panel is operably shaped to direct cooling airflow from a cavity of the first forward liner panel to a hot side of the second forward liner panel.

In addition to one or more of the features described above, or as an alternative, further embodiments may include that the first forward liner panel further includes a side wall at the first liner panel side edge of the first forward liner panel. The side wall further includes cooling film orifices.

In addition to one or more of the features described above, or as an alternative, further embodiments may include that the second forward liner panel further includes a side wall at the first liner panel side edge of the second forward liner panel. The side wall does not include cooling film orifices.

In addition to one or more of the features described above, or as an alternative, further embodiments may include an aft liner panel located aft of the first forward liner panel. The aft liner panel is in a spaced relationship with the first forward liner panel forming a circumferential gap therebetween.

In addition to one or more of the features described above, or as an alternative, further embodiments may include an aft liner panel located aft of the first forward liner panel. The aft liner panel is integrally attached to the first forward liner panel to form a combined liner panel.

In addition to one or more of the features described above, or as an alternative, further embodiments may include that the first liner panel side edge and the second liner panel side edge are linear in shape.

In addition to one or more of the features described above, or as an alternative, further embodiments may include that the first liner panel side edge and the second liner panel side edge are curvilinear in shape.

According to another embodiment, a gas turbine engine is provided. The gas turbine engine including a combustor. The combustor including a first forward liner panel. The forward liner panel including a liner panel forward edge, a liner panel aft edge opposite of the liner panel forward edge, and a first liner panel side edge between the liner panel aft edge and the liner panel forward edge. The first liner panel side edge is non-perpendicular to the liner panel forward edge and oriented at an angle about perpendicular to a swirl flow in the combustor.

According to another embodiment, a forward liner panel for use in a combustor of a gas turbine engine is provided. The forward liner panel including a liner panel forward edge, a liner panel aft edge opposite of the liner panel forward edge, and a first liner panel side edge between the liner panel aft edge and the liner panel forward edge. The first liner panel side edge is non-perpendicular to the liner panel forward edge and oriented at an angle about perpendicular to a swirl flow in the combustor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
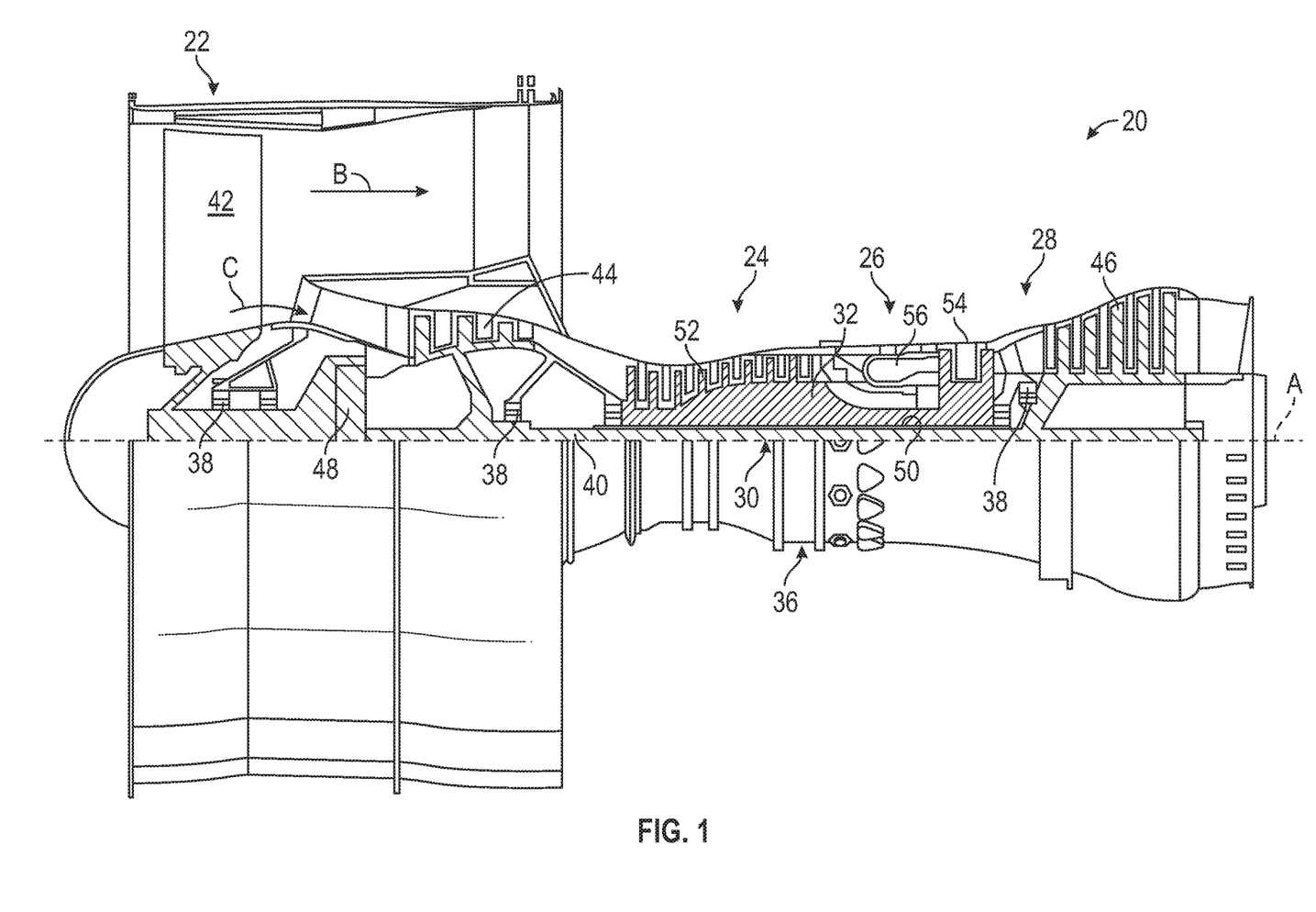
FIG. 1 is a partial cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
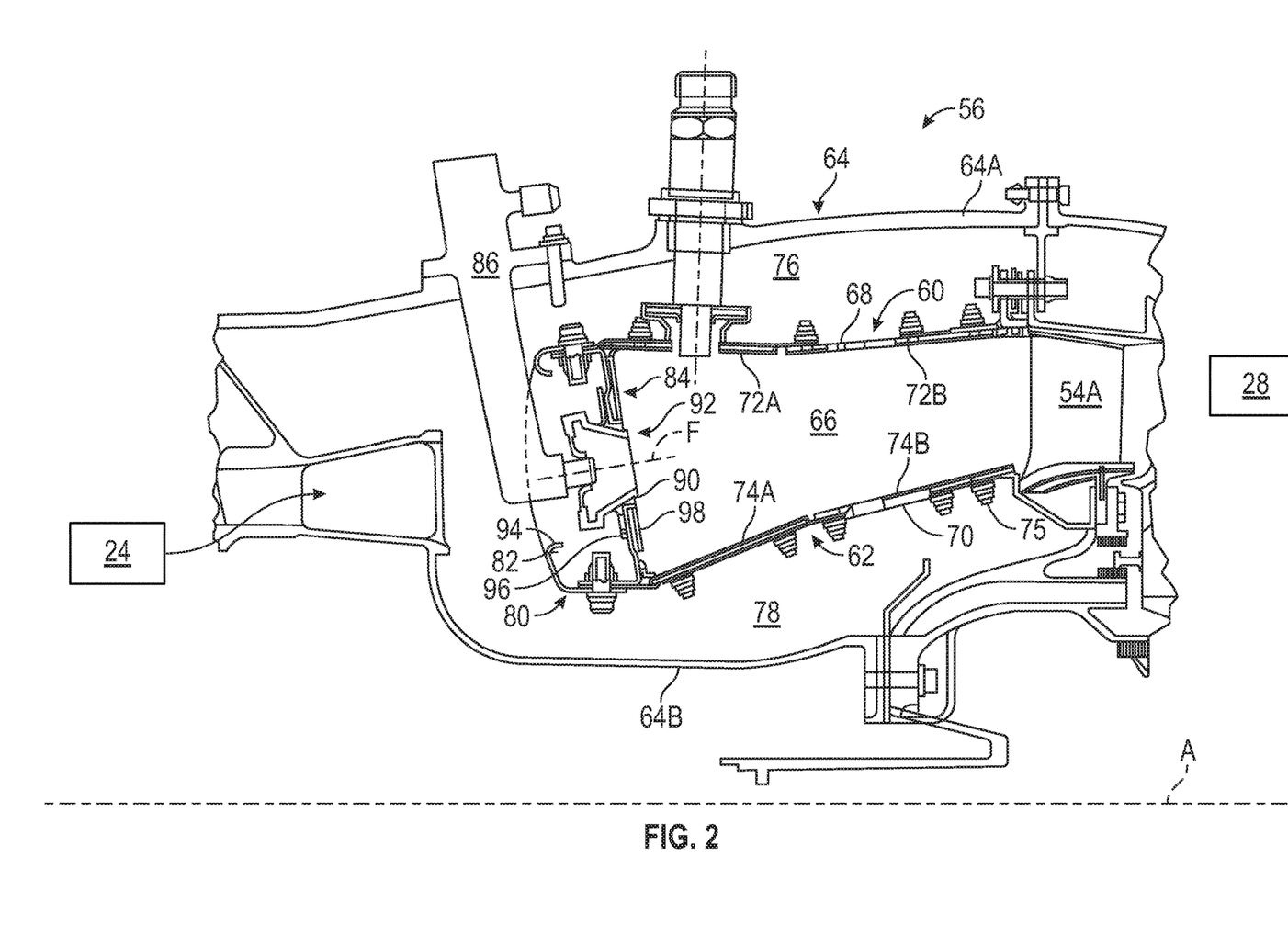
FIG. 2 is a cross-sectional illustration of a combustor that may be used in the gas turbine engine of FIG. 1.

Referring now to FIG. 2 and with continued reference to FIG. 1, the combustor section 26 of the gas turbine engine 20 is illustrated. The combustor 300 of FIG. 2 is an impingement film float wall combustor. It is understood that while an impingement film float wall combustor is utilized for exemplary illustration, the embodiments disclosed herein may be applicable to other types of combustors for gas turbine engines including but not limited to double pass liner combustors and float wall combustors.

As illustrated in FIG. 2, the combustor section 26 generally includes a combustor 56 with an outer combustor wall assembly 60, an inner combustor wall assembly 62 and a diffuser case module 64 therearound. The outer combustor wall assembly 60 and the inner combustor wall assembly 62 are spaced apart such that an annular combustion chamber 66 is defined therebetween.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto. Each of the liner panels 72, 74 may be generally rectilinear and manufactured of, for example, a nickel based super alloy, ceramic or other temperature resistant material and are arranged to form a liner array. In the example liner array, a plurality of forward liner panels 72A and a plurality of aft liner panels 72B line the outer shell 68. A plurality of forward liner panels 74A and a plurality of aft liner panels 74B also line the inner shell 70. It should be appreciated that the liner array may alternatively include but a single panel rather than the illustrated axial forward and axial aft panels.

The combustor 56 further includes a forward assembly 80 immediately downstream of the compressor section 24 to receive compressed airflow therefrom. The forward assembly 80 generally includes an annular hood 82, a bulkhead assembly 84, and a plurality of swirlers 90 (one shown). Each of the plurality of swirlers 90 is circumferentially aligned with one of a plurality of fuel nozzles 86 (one shown) and the respective hood ports 94 to project through the bulkhead assembly 84. The bulkhead assembly 84 includes a bulkhead support shell 96 secured to the combustor walls 60, 62, and a plurality of circumferentially distributed bulkhead liner panels 98 secured to the bulkhead support shell 96 around each respective swirler opening 92. The bulkhead support shell 96 is generally annular and the plurality of circumferentially distributed bulkhead liner panels 98 are segmented, typically one to each fuel nozzle 86 and swirler 90.

The annular hood 82 extends radially between, and is secured to, the forwardmost ends of the combustor wall assemblies 60, 62. The annular hood 82 includes a plurality of circumferentially distributed hood ports 94 that receive one of the respective plurality of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 into the respective swirler 90.

The forward assembly 80 introduces core combustion air into the forward section of the combustion chamber 66 while the remainder enters the outer annular plenum 76 and the inner annular plenum 78. The plurality of fuel nozzles 86 and adjacent structure generate a blended fuel-air mixture that supports stable combustion in the combustion chamber 66.

Opposite the forward assembly 80, the outer support shell 68 and the inner support shells 70 are mounted adjacent to a first row of Nozzle Guide Vanes (NGVs) 54A in the high pressure turbine 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
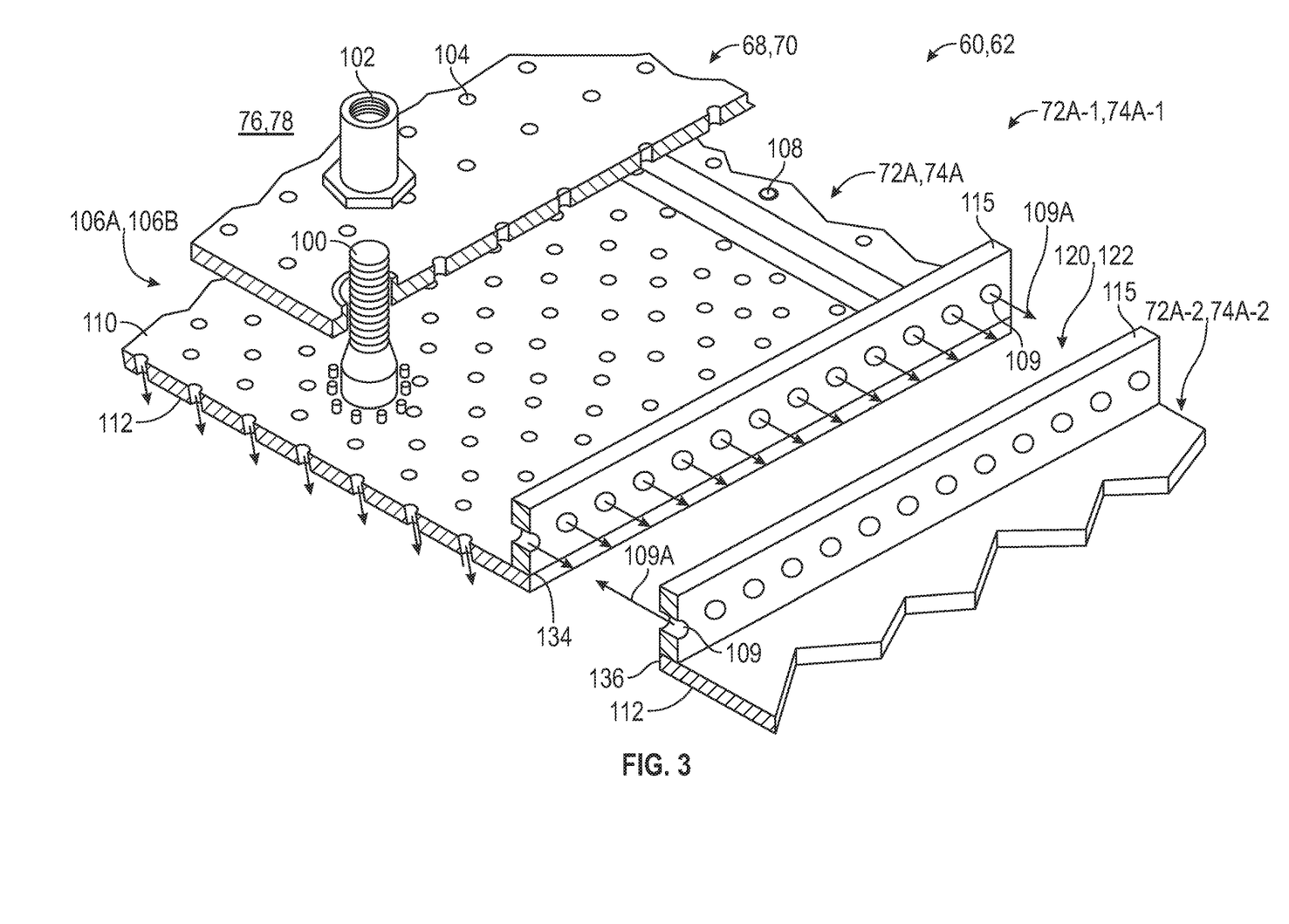
FIG. 3 is an exploded view of a wall assembly of the combustor of FIG. 3.

Referring now to FIG. 3 and with continued reference to FIGS. 1 and 2, a plurality of studs 100 (one shown) extend from the forward liner panels 72A, 74A so as to permit the forward liner panels 72A, 74A to be mounted to their respective support shells 68, 70 with fasteners 102 such as nuts. That is, the studs 100 project rigidly from the forward liner panels 72A, 74A and through the respective support shells 68, 70 to receive the fasteners 102 at a threaded distal end section thereof.

A plurality of cooling impingement passages 104 penetrate through the support shells 68, 70 to allow air from the respective annular plenums 76, 78 to enter cavities 106A, 106B formed in the combustor wall assemblies 60, 62 between the respective support shells 68, 70 and forward liner panels 72A, 74A. The cooling impingement passages 104 are generally normal to the surface of the forward liner panels 72A, 74A. The air in the cavities 106A, 106B provides cold side impingement cooling of the forward liner panels 72A, 74A. As used herein, the term impingement cooling is generally implies heat removal from a part via an impinging gas jet directed at a part.

A plurality of effusion passages 108 penetrate through each of the forward liner panels 72A, 74A. The geometry of the passages (e.g., diameter, shape, density, surface angle, incidence angle, etc.) as well as the location of the passages with respect to the high temperature main flow also contributes to effusion film cooling. The combination of impingement passages 104 and effusion passages 108 may be referred to as an Impingement Film Floatwall (IFF) assembly.

The effusion passages 108 allow the air to pass from the cavities 106A, 106B defined in part by a cold side 110 of the forward liner panels 72A, 74A to a hot side 112 of the forward liner panels 72A, 74A and thereby facilitate the formation of thin, cool, insulating blanket or film of cooling air along the hot side 112. The effusion passages 108 are generally more numerous than the impingement passages 104 to promote the development of film cooling along the hot side 112 to sheath the forward liner panels 72A, 74A. Film cooling as defined herein is the introduction of a relatively cooler air at one or more discrete locations along a surface exposed to a high temperature environment to protect that surface in the region of the air injection as well as downstream thereof.

The forward liner panels 72A, 74A includes a side wall 115 extending away from the cold side 110 of the forward liner panels 72A, 74A towards the support shell 68, 70. The side wall 115 may extend from the cold side 110 of the forward liner panels 72A, 74A to the support shell 68, 70 to form or partially enclose the cavities 106A, 106B. The side wall 115 is located at a first liner panel side edge 134 of the forward liner panels 72A, 74A. The side wall 115 may extend about perpendicular away from the cold side 110 of the forward liner panels 72A, 74A.

The side wall 115 includes plurality of cooling film orifices 109 extending through the side wall 115. As illustrated in FIG. 3, the cooling film orifices 109 may circular in shape. It is understood that the cooling film orifices 109 are not limited to being circular in shape the cooling film orifices 109 may comprise an elliptical, an oval, a rectangular, a polygonal, or any other desired shape.

The forward liner panel 72A, 74A of FIG. 3 may also be referred to as a first forward liner panel 72A-1, 74A-1 when discussing two or more forward liner panels 72A, 74A. A second forward liner panel 72A-2, 74A-2 is circumferentially adjacent to a first forward liner panel 72A-1, 74A-1. The cooling film orifices 109 of the first forward liner panel 72A-1, 74A-1 direct cooling air 109A from the within the cavities 106A, 106B into a gap 120, 122 and towards the second forward liner panel 72A-2, 74A-2 adjacent to the first forward liner panel 72A-1, 74A-1. The gap 120, 122 is formed between the first forward liner panel 72A-1, 74A-1 and the second forward liner panel 72A-2, 74A-2.

Conventionally, the second forward liner panel 72A-2, 74A-2 also includes cooling film orifices 109 in the side wall 115 located at a second liner panel side edge 136 of the second forward liner panel 72A-2, 74A-2. Also conventionally, the cooling film orifices 109 of the second forward liner panel 72A-2, 74A-2 direct cooling airflow 109A directly towards the side wall 115 of the first liner. Thus, conventionally, the cooling airflow 109A from the second forward liner panel 72A-2, 74A-2 work against and/or directly opposed the cooling airflow 109A from the first forward liner panel 72A-1, 74A-1.

The embodiments disclosed herein seek to remove the cooling film orifices 109 from the second liner panel side edge 136 of the second forward liner panel 72A-2, 74A-2, thus removing interference with the cooling film orifices 109 for the first forward liner panel 72A-1, 74A-1. The embodiments disclosed herein seek to also direct the cooling air 109A from the cooling film orifices 109 towards a hot side 112 of the second forward liner panel 72A-2, 74A-2 and thereby facilitates the formation of thin, cool, insulating blanket or film of cooling air along the hot side 112 of the second forward liner panel 72A-2, 74A-2.

Figure 4:
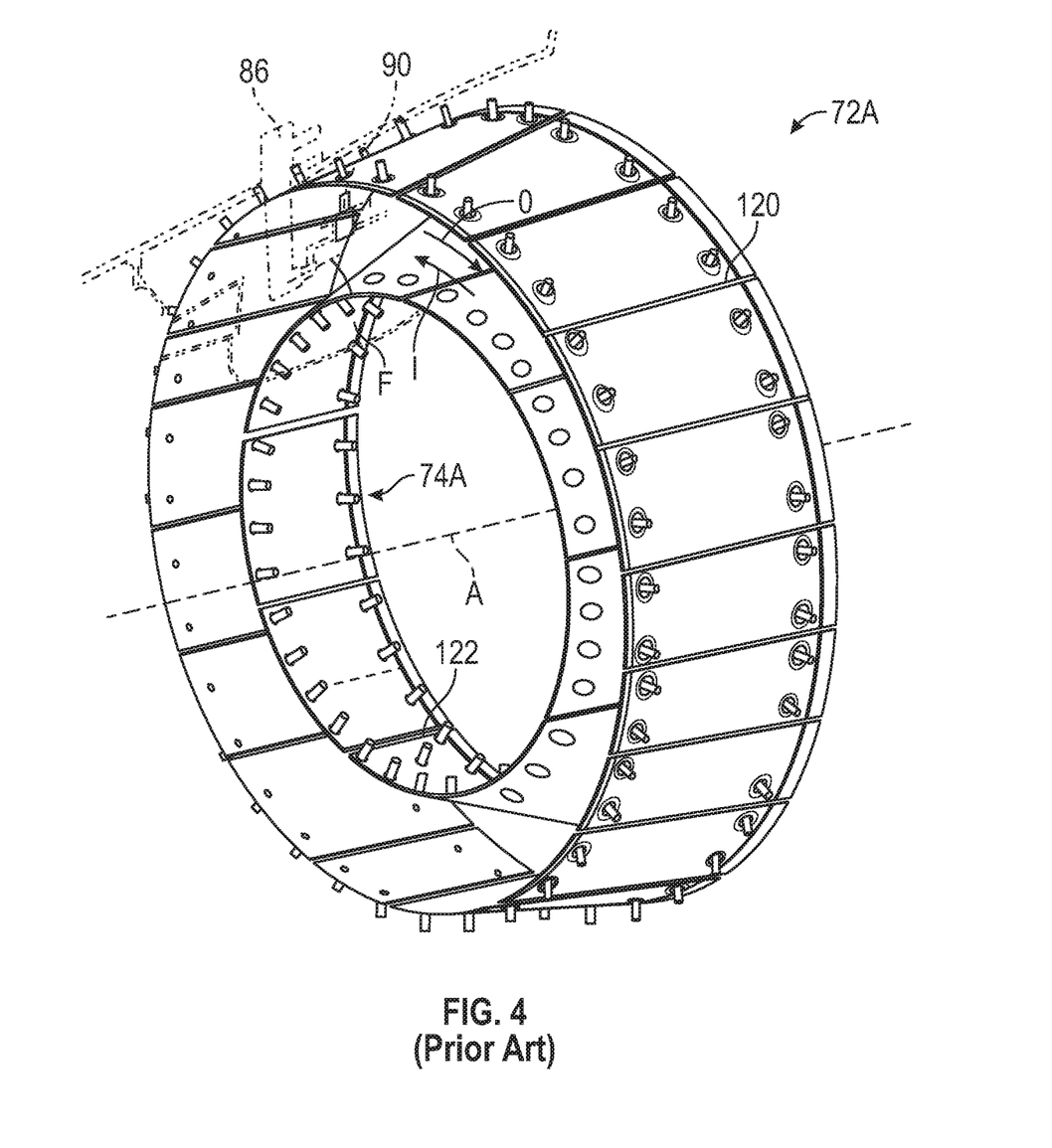
FIG. 4 is a perspective view of a combustor with non-swept liner panels.
Figure 5:
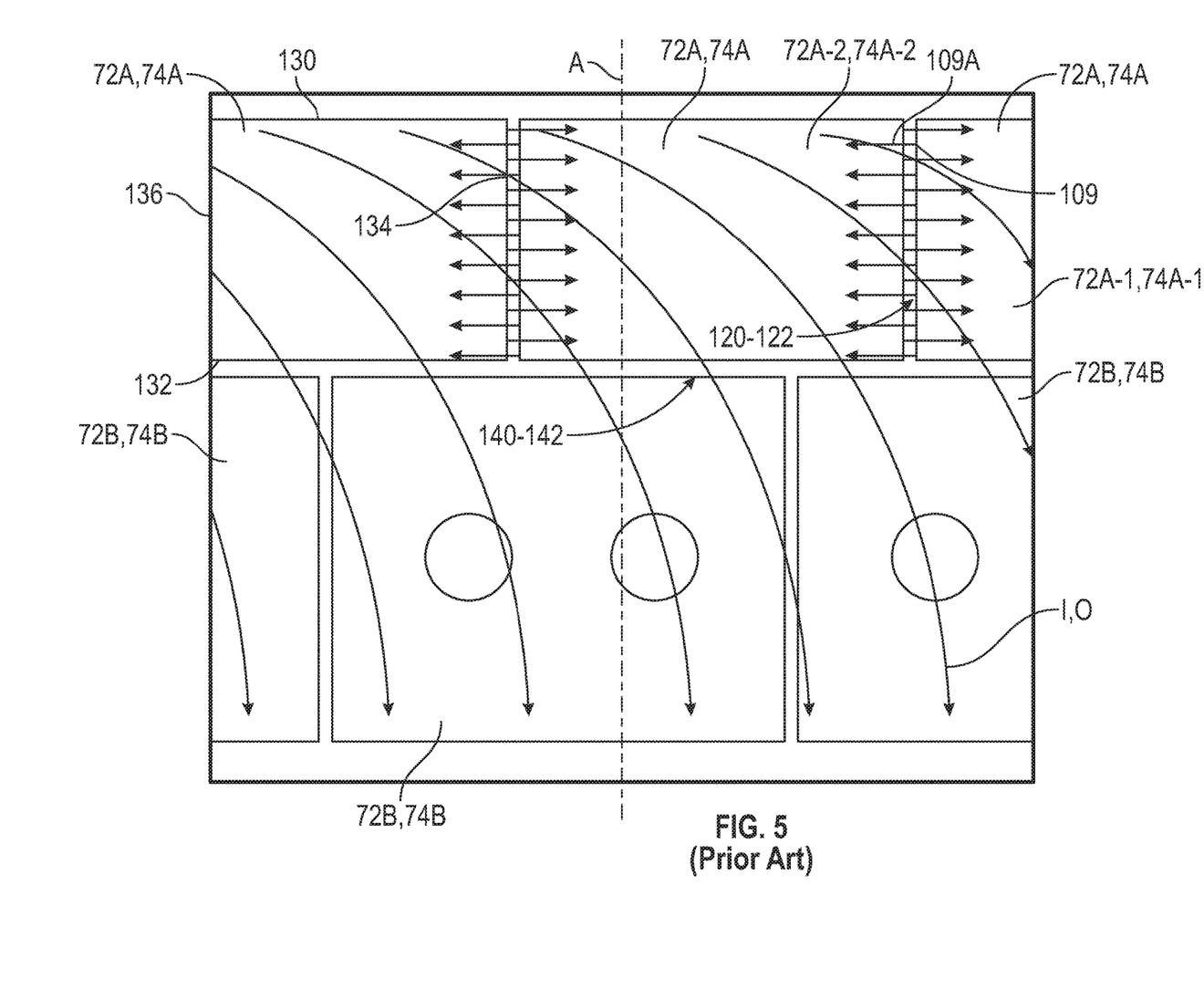
FIG. 5 is a schematic view of the combustor with the non-swept liner panels of FIG. 4.

Referring now to FIGS. 4 and 5, with continued reference to FIGS. 1-3, the combustor wall assemblies 60, 62 define gaps 120, 122 between each pair of the forward liner panels 72A, 74A to be parallel to the engine longitudinal axis A as conventionally practiced. That is, each gap 120, 122 is axial or parallel to the engine central longitudinal axis A of the gas turbine engine. In an embodiment, the aft liner panels 72B, 74B are non-swept relative to the engine longitudinal axis A or parallel to the engine longitudinal axis A. The non-swept liner panel array illustrated in FIGS. 4 and 5 directs cooling air 109A from the cooling film orifices 109 circumferentially outward from the forward liner panels 72A, 74A towards an adjacent forward liner panel 72A, 74A. For example, as shown in FIG. 5, a first forward liner panel 72A-1, 74A-1 is adjacent to a second forward liner panel 72A-2, 74A-2 and cooling firm orifices 109 from the first forward liner panel 72A-1, 74A-1 direct cooling air 109A towards the second forward liner panel 72A-2, 74A-2.

Also illustrated in FIGS. 4 and 5 are an outer peripheral flow O and an inner peripheral flow I, which may be referred to in combination as the swirl flows I, O. An outer peripheral flow O, as defined herein, is the outermost adjacent to the respective outer forward liner panels 72A generally formed by the combined flow from the plurality of upstream swirlers 90 and the upstream fuel nozzle 86. The inner peripheral flow I, as defined herein, is the innermost flow adjacent to the inner liner panels 74A generally formed by the combined flow from the plurality of upstream swirlers 90. That is, for a plurality of swirlers 90, each of which provides an example counterclockwise flow, the outer peripheral flow O adjacent to the respective outer liner panels 72 is generally counterclockwise while the inner peripheral flow I adjacent to the respective inner liner panels 74 is generally clockwise.

The forward liner panel 72A, 74A include a liner panel forward edge 130, a liner panel aft edge 132, a first liner panel side edge 134 and a second liner panel side edge 136. The liner panel aft edge 132 is opposite the liner panel forward edge 130. The liner panel aft edge 132 is about parallel to the liner panel forward edge 130. The first liner panel side edge 134 and the second liner panel side edge 136 extend between the liner panel aft edge 132 and the liner panel forward edge 130. The first liner panel side edge 134 is about parallel to the second liner panel side edge 136. The first liner panel side edge 134 and the second liner panel side edge 136 are perpendicular to the liner panel forward edge 130 and the liner panel aft edge 132 to form the gap 120, 122 between each of the plurality of forward liner panels 72A, 74A. A plurality of aft liner panels 72B, 74B are located aft of the forward liner panels 72A, 74A. The plurality of aft liner panels 72B, 74B are in a spaced relationship with the forward liner panels 72A, 74A forming a circumferential gap 140, 142 therebetween.

Figure 6:
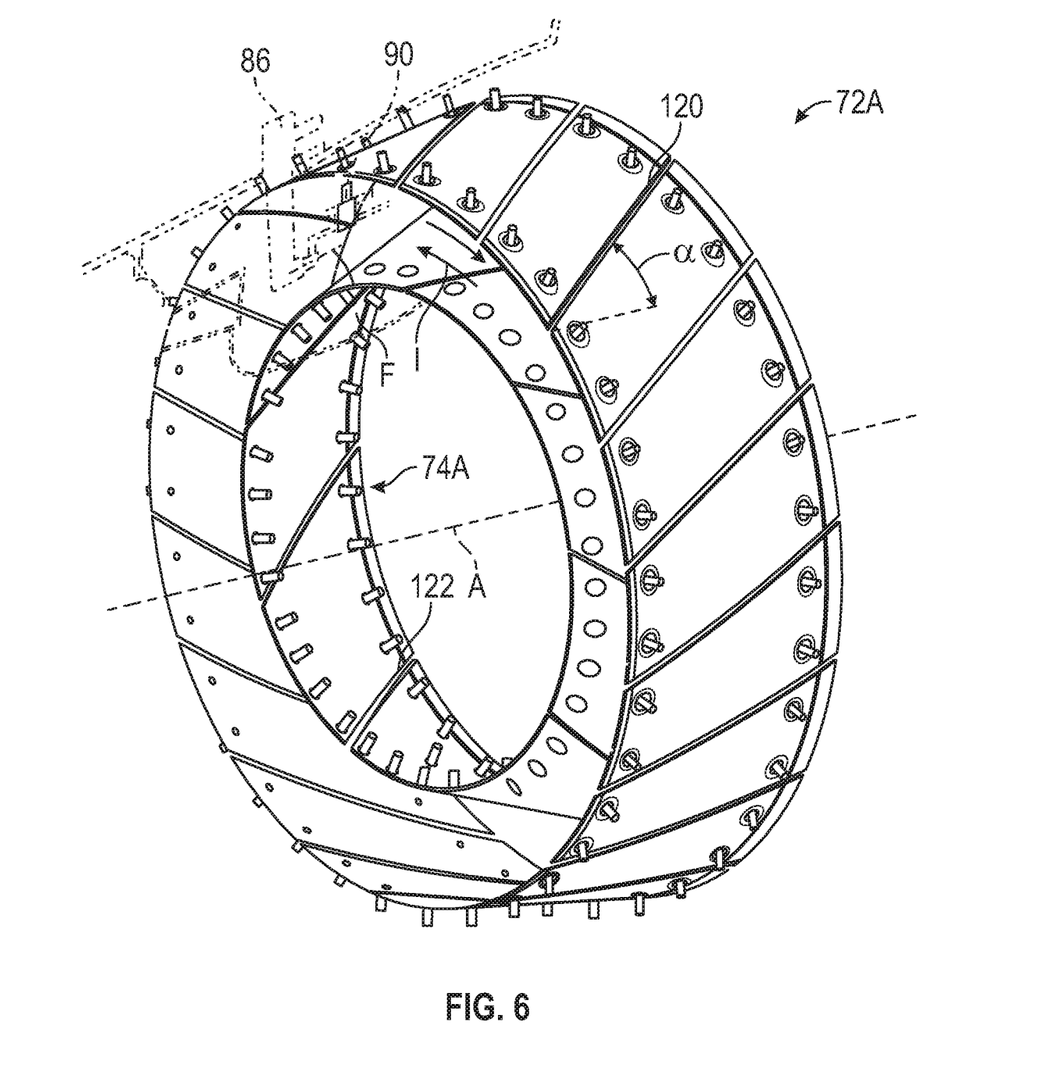
FIG. 6 is a perspective view of a combustor with swept liner panels, in accordance with an embodiment of the present disclosure.
Figure 7:
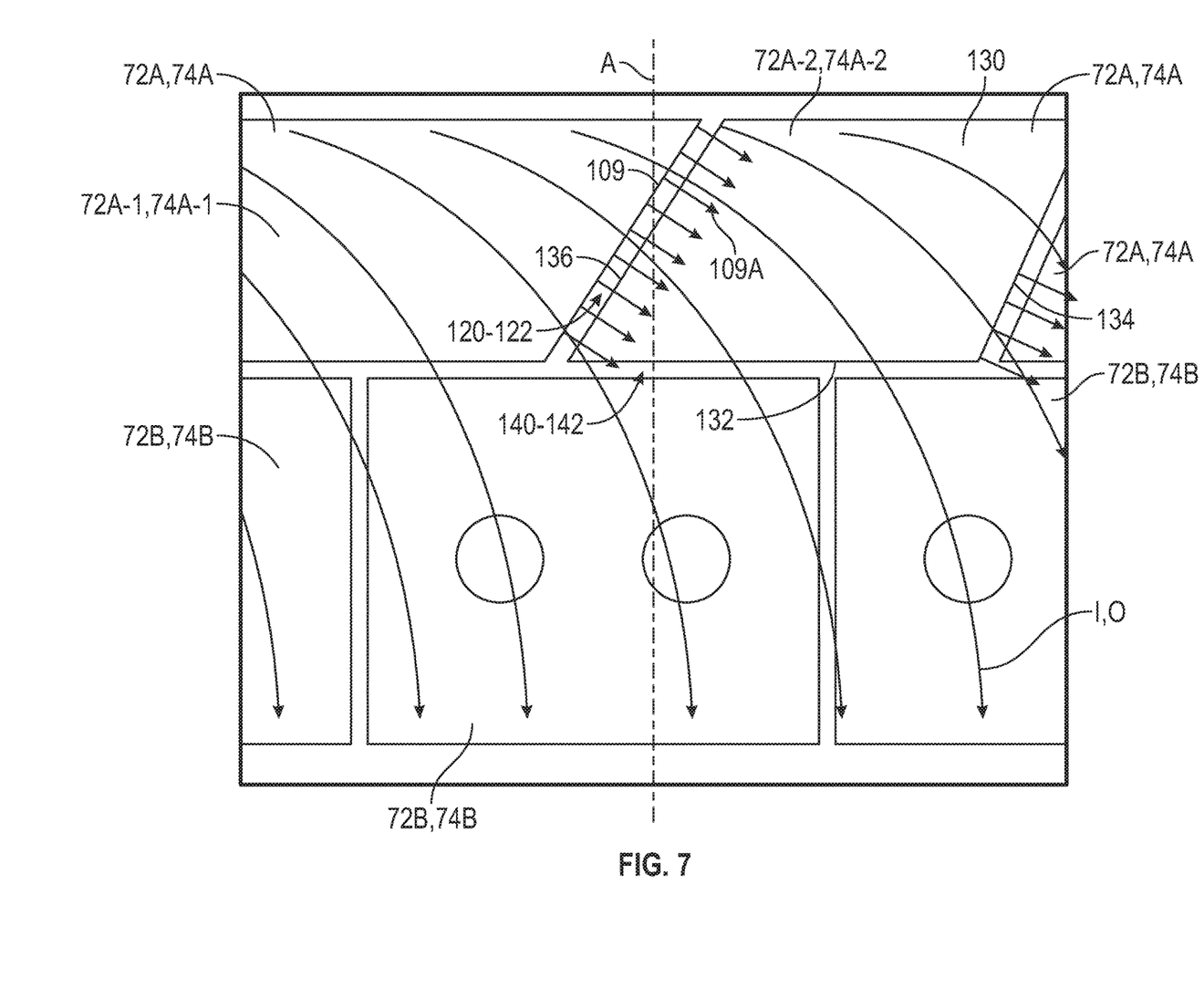
FIG. 7 is a schematic view of the combustor with the swept liner panels of FIG. 6, in accordance with an embodiment of the present disclosure.

Referring now to FIGS. 6 and 7 and with continued reference to FIGS. 1-3, the combustor wall assemblies 60, 62 define gaps 120, 122 between each pair of the forward liner panels 72A, 74A to be non-parallel to the engine longitudinal axis A. That is, each gap 120, 122 swept in a direction about perpendicular to a swirl flow I, O from the upstream swirlers 90, such that cooling air 109A exiting the cooling film orifices 109 exit about parallel with the swirl flow I, O. As illustrated in FIG. 7, the orifices 109 are only present on the first liner panel side edge 134 and not on the second line panel side edge 134 to prevent interference with the cooling air 109A exiting the orifice 109. The swept liner panel array thereby may prevent a potential hot streak from the upstream fuel nozzle 86 (one shown schematically) along the length of the gap 120, 122 or forward liner panels 72A, 74A. The degree of sweep may, for example, be an angle α between about ten (10) to forty-five (45) degrees and in particular of about twenty (20) degrees with respect to the engine longitudinal axis A. In an embodiment, the angle α may be between (1) degree and (60) degrees. In another embodiment, the angle α may be between (20) degrees and (45) degrees. It should be appreciated that various sweep angles will benefit herefrom. In an embodiment, the aft liner panels 72B, 74B are non-swept relative to the engine longitudinal axis A or parallel to the engine longitudinal axis A.

The swept liner panel array illustrated in FIGS. 6 and 7 directs cooling air 109A from the cooling film orifices 109 circumferentially outward from the forward liner panels 72A, 74A towards an adjacent forward liner panel 72A, 74A. For example, as shown in FIG. 7, a first forward liner panel 72A-1, 74A-1 is adjacent to a second forward liner panel 72A-2, 74A-2 and cooling firm orifices 109 from the first forward liner panel 72A-1, 74A-1 direct cooling air 109A towards the second forward liner panel 72A-2, 74A-2 about parallel to the swirl flow I, O. As shown in FIGS. 6-7, the forward liner panels 72A, 74A are swept relative to the direction of swirl of fuel-air mixture swirl flows I, O.

In certain embodiments, the gaps 120, 122 between the adjacent respective forward liner panels 72A, 74A are swept about perpendicular to the swirl flow I, O from the upstream swirlers 90. In one disclosed non-limiting embodiment, the gaps 120 between the respective outer forward liner panels 72A are swept in a direction opposite the gaps 122 between the respective inner forward liner panels 74A. The gaps 120 between the respective forward liner panels 72A are thereby in a direction about perpendicular the outer peripheral flow O while the gaps 122 between the respective inner forward liner panels 74A are in a direction about perpendicular to the inner peripheral flow I.

The outer peripheral flow O, as defined herein, is the outermost adjacent to the respective outer liner panels 72A generally formed by the combined flow from the plurality of upstream swirlers 90 and the upstream fuel nozzle 86. The inner peripheral flow I, as defined herein, is the innermost flow adjacent to the inner liner panels 74A generally formed by the combined flow from the plurality of upstream swirlers 90. That is, for a plurality of swirlers 90, each of which provides an example counterclockwise flow, the outer peripheral flow O adjacent to the respective outer liner panels 72 is generally counterclockwise when viewed axially from an aft end of the gas turbine engine while the inner peripheral flow I adjacent to the respective inner liner panels 74 is generally clockwise when viewed axially from an aft end of the gas turbine engine. Such resultant peripheral flow directions are opposite and thereby result in an opposite sweep of the respective gaps 120, 122. That is, the degree of sweep is an angle α with the adjacent flow swirl I, O. The angle α is measured relative to the engine longitudinal axis. In an embodiment, the outer liner panels 72A may be swept in clockwise direction forward-to-aft relative to the engine longitudinal axis A when viewed axially from an aft end of the gas turbine engine 20. In an embodiment, the inner liner panels 74A may be swept in counterclockwise direction forward-to-aft relative to the engine longitudinal axis A when viewed axially from an aft end of the gas turbine engine 20. It is understood that the embodiments disclosed herein may also be applicable to gas turbine engines having an outer peripheral flow that is generally clockwise and an inner peripheral flow that is generally counterclockwise.

The forward liner panel 72A, 74A include a liner panel forward edge 130, a liner panel aft edge 132, a first liner panel side edge 134 and a second liner panel side edge 136. The liner panel aft edge 132 is about parallel to the liner panel forward edge 130. The first liner panel side edge 134 and the second liner panel side edge 136 extend between the liner panel aft edge 132 and the liner panel forward edge 130. The first liner panel side edge 134 is about parallel to the second liner panel side edge 136. At least one of the first liner panel side edge 134 and the second liner panel side edge 136 is at an angle α about perpendicular to the swirl flow I, O in the combustor 56. In an embodiment, the first liner panel side edge 134 is at an angle α about perpendicular to the swirl flow I, O in the combustor 56. In another embodiment, the second liner panel side edge 136 is at an angle α about perpendicular to the swirl flow I, O in the combustor 56.

The first liner panel side edge 134 and the second liner panel side edge 136 are non-perpendicular to the liner panel forward edge 130 and the liner panel aft edge 132 to form the gap 120, 122 between each of the plurality of forward liner panels 72A, 74A. A plurality of aft liner panels 72B, 74B are located aft of the forward liner panels 72A, 74A. The plurality of aft liner panels 72B, 74B are in a spaced relationship with the forward liner panels 72A, 74A forming a circumferential gap 140, 142 therebetween.

Figure 8:
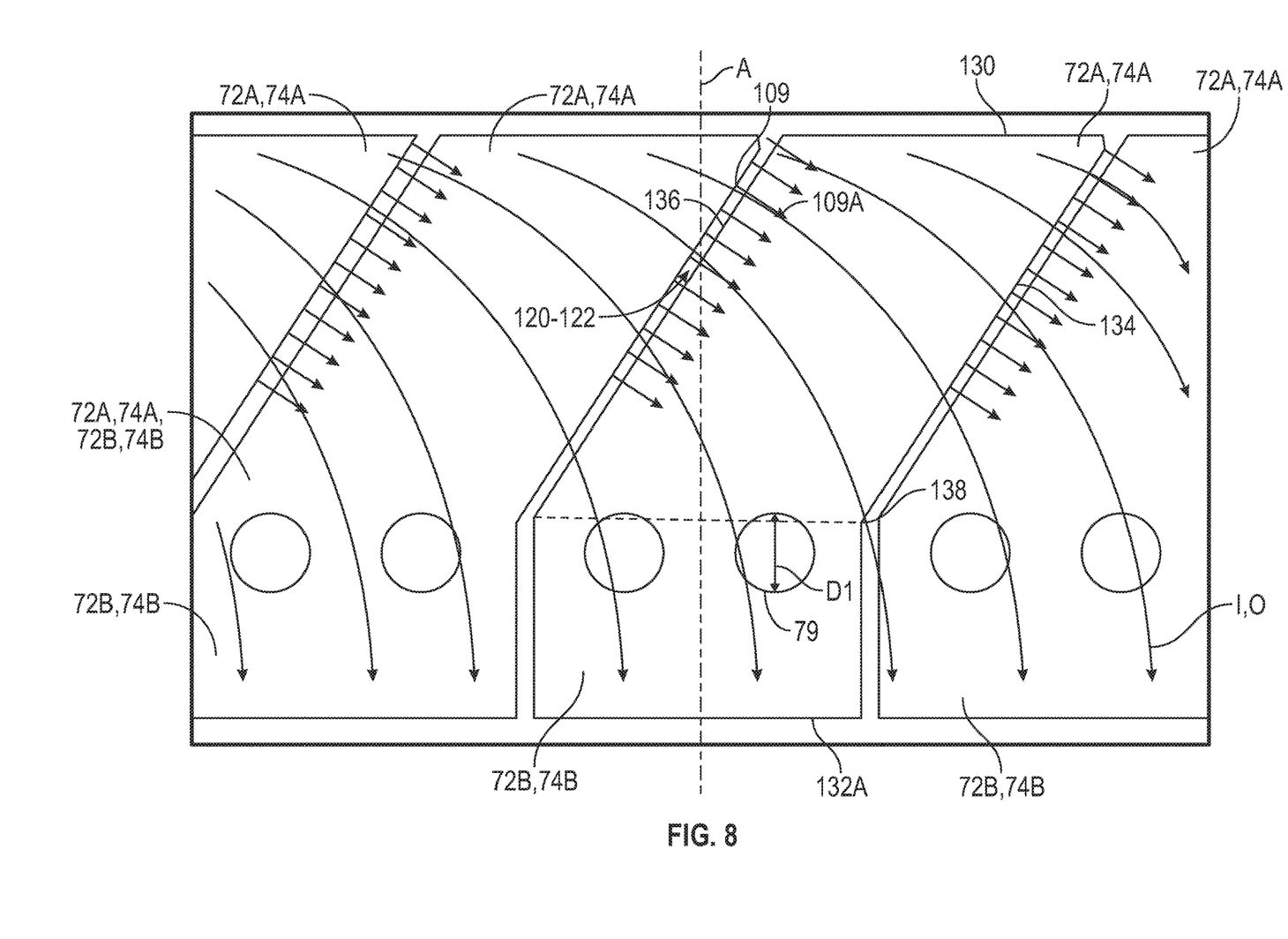
FIG. 8 is a schematic view of a combustor with swept liner panels, in accordance with an embodiment of the present disclosure.
Figure 9:
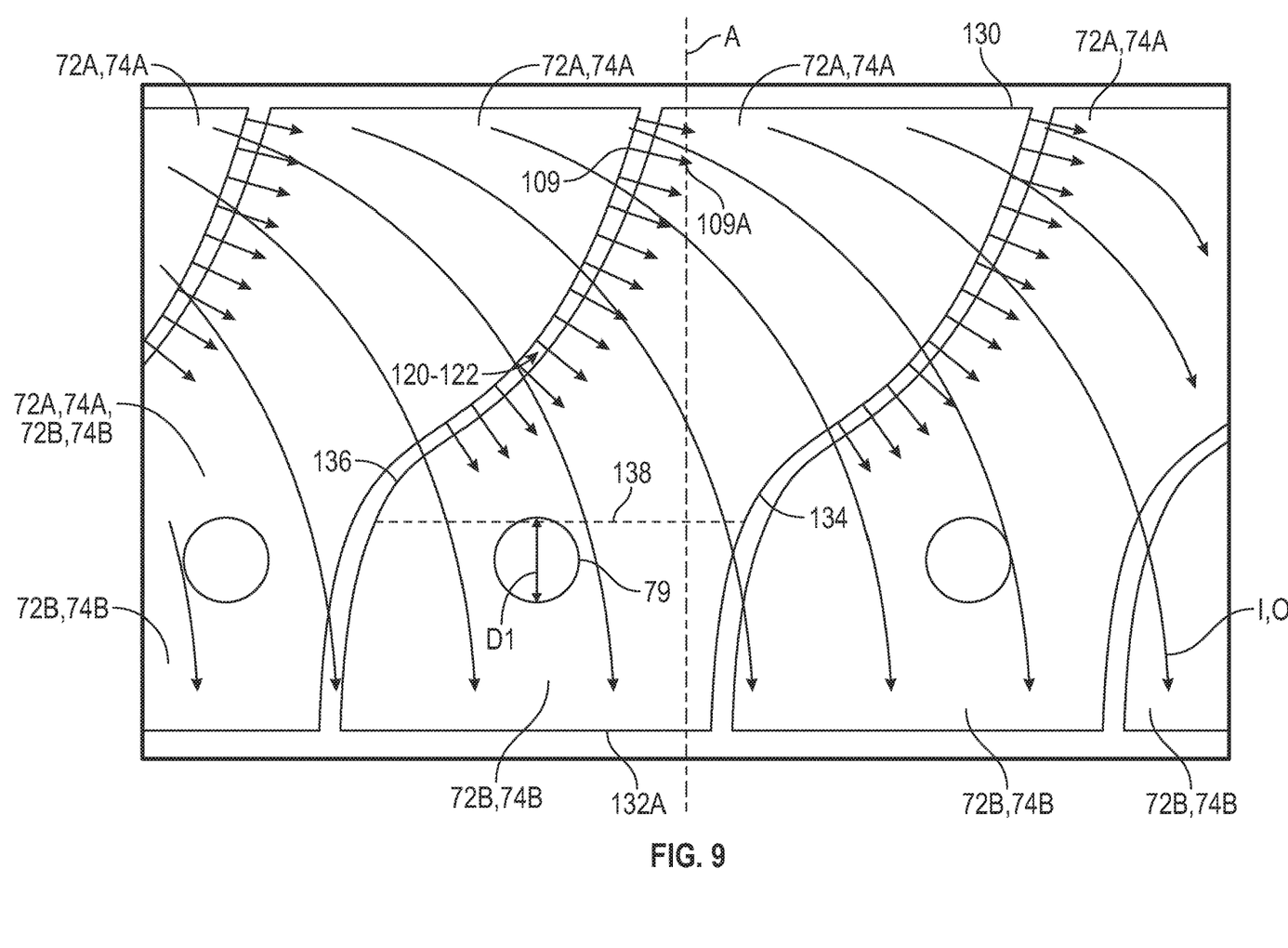
FIG. 9 is a schematic view of the combustor with swept liner panels, in accordance with an embodiment of the present disclosure.

Referring now to FIGS. 8 and 9 and with continued reference to FIGS. 1-3, the combustor wall assemblies 60, 62 define gaps 120, 122 between each pair of the forward liner panels 72A, 74A to be non-parallel to the engine longitudinal axis A. That is, each gap 120, 122 swept in a direction about perpendicular to a swirl flow I, O from the upstream swirlers 90, such that cooling air 109A exiting the cooling film orifices 109 exit about parallel with the swirl flow I, O. As illustrated in FIGS. 8 and 9, the orifices 109 are only present on the first liner panel side edge 134 and not on the second line panel side edge 134 to prevent interference with the cooling air 109A exiting the orifice 109. In an embodiment, the aft liner panels 72B, 74B are non-swept relative to the engine longitudinal axis A or parallel to the engine longitudinal axis A. In another embodiment, the aft liner panels 72B, 74B are integrally attached to the forward liner panels 72A, 74A to form a combined liner panel 72A, 74A, 72B, 74B, as illustrated in FIGS. 8 and 9, thus eliminating the circumferential gap 140, 142 illustrated in FIGS. 5 and 7.

The combined liner panel 72A, 74A, 72B, 74B include a liner panel forward edge 130, a combined liner panel aft edge 132A, a first liner panel side edge 134 and a second liner panel side edge 136. The combined liner panel aft edge 132A is about parallel to the liner panel forward edge 130. The first liner panel side edge 134 and the second liner panel side edge 136 extend between the combined liner panel aft edge 132A and the liner panel forward edge 130. The first liner panel side edge 134 is about parallel to the second liner panel side edge 136. The first liner panel side edge 134 and the second liner panel side edge 136 are non-perpendicular to the liner panel forward edge 130 but changes to be about perpendicular to the combined liner panel aft edge 132A at an intermediate point 138 to form the gap 120 between each of the plurality of forward liner panel 72A, 74A, as shown in FIG. 8. The intermediate point 138 may be located forward and proximate the quench holes 79. The quench hole 79 may have a quench hole diameter D1 and the intermediate point 138 may be located between about three quench diameters D1 forward of the quench hole 79 (i.e., 3×D1) and about one quench diameter D1 aft of the quench hole 79 (i.e., 1×D1). It is understood that the intermediate point 138 may also be located in other locations. The first liner panel side edge 134 and the second liner panel side edge 136 may be linear in shape as shown in FIG. 8 or curvilinear in shape as shown in FIG. 9.

Figure 10:
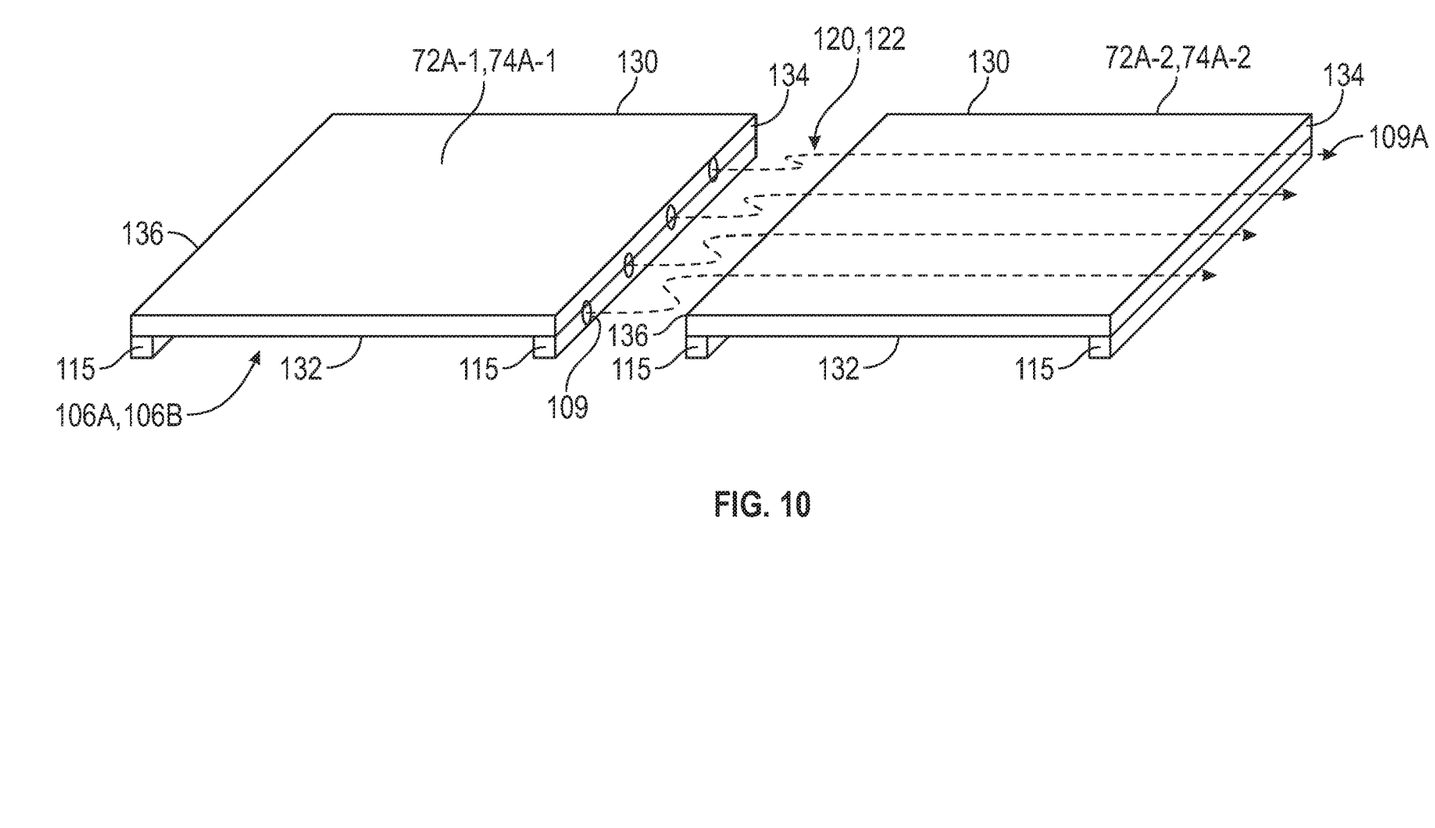
FIGS. 10, 10A, 10B, and 10C are schematic views of different relative spatial orientations of a first forward liner panel and a second forward liner panel, in accordance with an embodiment of the present disclosure.
Figure 10A:
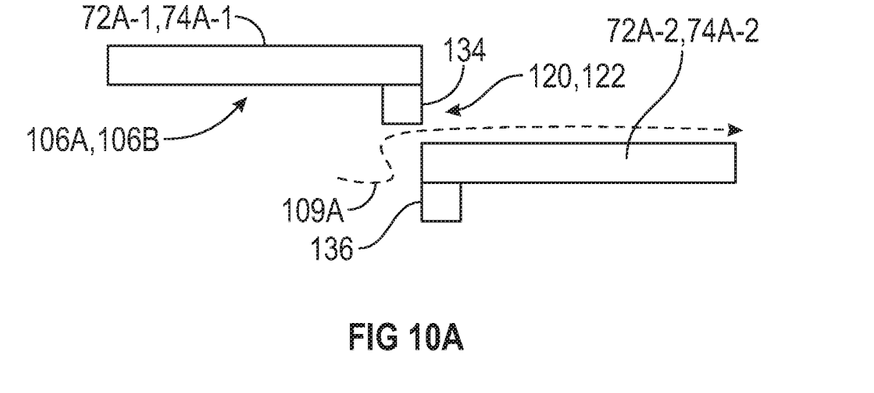
Figure 10B:
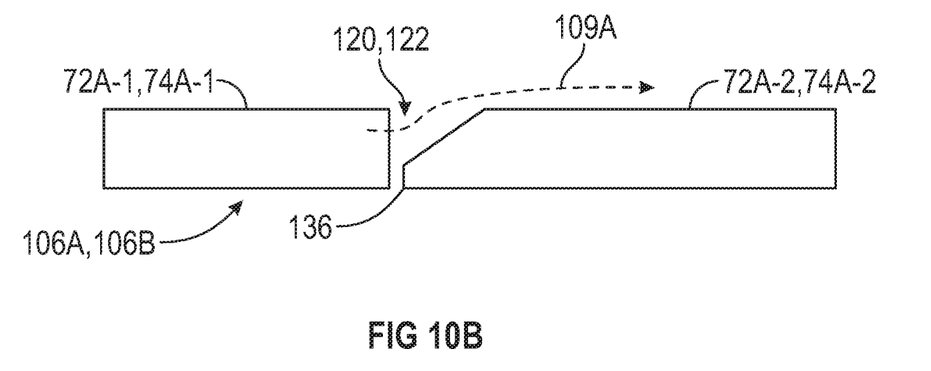
Figure 10C:
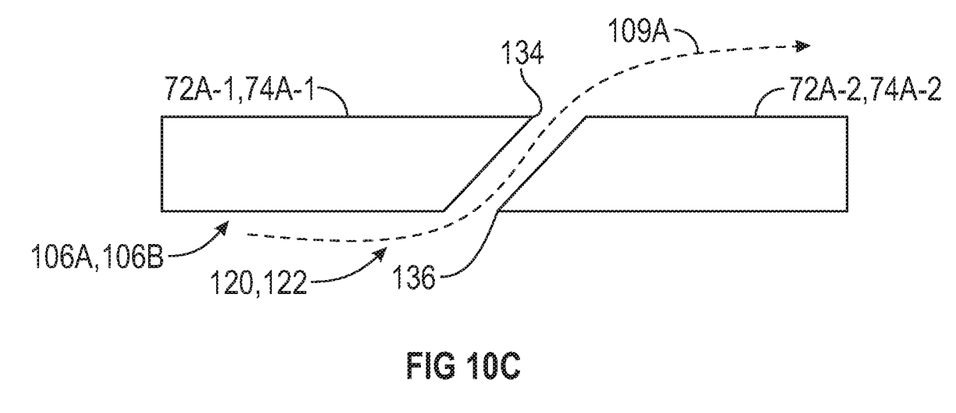

Referring now to FIGS. 10, 10A, 10B, and 10C, and with continued reference to FIGS. 1-9, a first forward liner panel 72A-1, 74A-1, and a second forward liner panel 72A-2, 74A-2 are illustrated, in accordance with an embodiment of the present disclosure. The second forward liner panel 72A-2, 74A-2 is adjacent to the first forward liner panel 72A-1, 74A-1 within the combustor 56. The first forward liner panel 72A-1, 74A-1 and the second forward liner panel 72A-2, 74A-2 each include a liner panel forward edge 130, a liner panel aft edge 132, a first liner panel side edge 134, and a second liner panel side edge 136. A side wall 115 may be located at the first liner panel side edge 134 and the second liner panel side edge 136, as shown in FIG. 10.

The first forward liner panel 72A-1, 74A-1 may be in a spaced relationship with the second forward liner panel 72A-2, 74A-2 defining the gap 120, 122 therebetween. More specifically, the first liner panel side edge 134 of the first forward liner panel 72A-1, 74A-1 may be in a facing spaced relationship with the second liner panel side edge 136 of the second forward liner panel 72A-2, 74A-2 defining the gap 120, 122 therebetween.

Cooling airflow 109A may be directed from the cavity 106A, 106B of the first forward liner panel 72A-1, 74A-1 to a hot side 112 of the second forward liner panel 72A-2, 74A-2. The cooling airflow 109A may be directed from the cavity 106A, 106B of the first forward liner panel 72A-1, 74A-1 to a hot side 112 of the second forward liner panel 72A-2, 74A-2 via cooling film orifices 109 as aforementioned or around the side wall 115 at the first liner panel side edge 134 of the first forward liner panel 72A-1, 74A-1. In an embodiment, a side wall 115 may be located at the second liner panel side edge 136 of the second forward liner panel 72A-2, 74A-2 and the side wall 115 of the second liner panel side edge 136 of the second forward liner panel 72A-2, 74A-2 does not include cooling film orifices 109. Additionally, in the embodiment illustrated in FIG. 10 the first forward liner panel 72A-1, 74A-1 may be offset from the second forward liner panel 72A-2, 74A-2 to direct cooling airflow 109A from the cavity 106A, 106B of the first forward liner panel 72A-1, 74A-1 to a hot side 112 of the second forward liner panel 72A-2, 74A-2. More specifically, the first liner panel side edge 134 of the first forward liner panel 72A-1, 74A-1 may be offset from the second liner panel side edge 136 of the second forward liner panel 72A-2, 74A-2 to direct cooling airflow 109A from the cavity 106A, 106B of the first forward liner panel 72A-1, 74A-1 to a hot side 112 of the second forward liner panel 72A-2, 74A-2.

In another embodiment, at least one of the first liner panel side edge 134 of the first forward liner panel 72A-1, 74A-1 and the second liner panel side edge 136 of the second forward liner panel 72A-2, 74A-2 may be operably shaped to direct cooling airflow 109A from the cavity 106A, 106B of the first forward liner panel 72A-1, 74A-1 to a hot side 112 of the second forward liner panel 72A-2, 74A-2. In the embodiment illustrated in FIG. 2, the second liner panel side edge 136 of the second forward liner panel 72A-2, 74A-2 is operably shaped to direct cooling airflow 109A from the cavity 106A, 106B of the first forward liner panel 72A-1, 74A-1 to a hot side 112 of the second forward liner panel 72A-2, 74A-2. In the embodiment illustrated in FIG. 2, the first liner panel side edge 134 of the first forward liner panel 72A-1, 74A-1 and the second liner panel side edge 136 of the second forward liner panel 72A-2, 74A-2 are operably shaped to direct cooling airflow 109A from the cavity 106A, 106B of the first forward liner panel 72A-1, 74A-1 to a hot side 112 of the second forward liner panel 72A-2, 74A-2.

The liner panel aft edge 132 is about parallel to the liner panel forward edge 130. The first liner panel side edge 134 and the second liner panel side edge 136 extend between the liner panel aft edge 132 and the liner panel forward edge 130. The first liner panel side edge 134 is about parallel to the second liner panel side edge 136. The first liner panel side edge 134 and the second liner panel side edge 136 are non-perpendicular to the liner panel forward edge 130 and the liner panel aft edge 132 to form the gap 120, 122 between each of the plurality of forward liner panel 72A, 74A. In an embodiment, the first liner panel side edge 134 and the second liner panel side edge 136 are swept in a direction perpendicular to the swirl flow I, O, as discussed herein.

Advantageously, by sweeping the first liner panel side edge 134 and the second liner panel side edge 136 so that the first liner panel side edge 134 and the second liner panel side edge 136 are swept in a direction perpendicular to the swirl flow I, O, then the cooling air 109A ejected from the side walls 115 at the first liner panel side edge 134 can follow a vector similar to the swirl flow I, O, which allows the protective cooling film applied to the hot side 112 of an adjacent forward liner panel to decay slower and improve overall film effectiveness and not be broken down by gas path velocity following a different, competing path. The cooling air 109A generates a cooling film on the hot side 112 that will more effectively cover and protect downstream panels from hot combusting gas, which locally reduces panel temperature and improves life and durability of the liner panel. Improving the cooling film effectiveness makes better use of cooling airflow that is carefully allocated.

Technical effects of embodiments of the present disclosure include sweeping a first liner panel side edge and the second liner panel side edge of a forward liner panel in a direction perpendicular to the swirl flow within the combustor.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

It should be appreciated that relative positional terms such as "forward," "aft," "upper," "lower," "above," "below," and the like are with reference to the normal operational attitude of the vehicle and should not be considered otherwise limiting.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor of a gas turbine engine, the combustor comprising:
   a first forward liner panel comprising:
      a liner panel forward edge;
      a liner panel aft edge opposite of the liner panel forward edge;
      a first liner panel side edge between the liner panel aft edge and the liner panel forward edge; and
      a second liner panel side edge between the liner panel aft edge and the liner panel forward edge, the second liner panel side edge being about parallel to the first liner panel side edge,
         wherein the first liner panel side edge is non-perpendicular to the liner panel forward edge and oriented at an angle about perpendicular to a swirl flow in the combustor, and
         wherein the second liner panel side edge is non-perpendicular to the liner panel forward edge and oriented at an angle about perpendicular to the swirl flow in the combustor; and
   a second forward liner panel circumferentially adjacent to the first forward liner panel, the first forward liner panel and the second forward liner panel being in a spaced relationship forming a gap therebetween,
   wherein the second forward liner panel further comprises:
      a liner panel forward edge;
      a liner panel aft edge opposite of the liner panel forward edge of the second forward liner panel;
      a first liner panel side edge between the liner panel aft edge of the second forward liner panel and the liner panel forward edge of the second forward liner panel, wherein the first liner panel side edge of the second forward liner panel is non-perpendicular to the liner panel forward edge of the second forward liner panel and oriented at an angle about perpendicular to the swirl flow in the combustor; and
      a second liner panel side edge between the liner panel aft edge of the second forward liner panel and the liner panel forward edge of the second forward liner panel, the second liner panel side edge of the second forward liner panel being about parallel to the first liner panel side edge of the second forward liner panel,
         wherein the second liner panel side edge of the second forward liner panel is non-perpendicular to the liner panel forward edge of the second forward liner panel and oriented at an angle about perpendicular to the swirl flow in the combustor,
         wherein the second liner panel side edge of the second forward liner panel is operably shaped to direct cooling airflow from a cavity of the first forward liner panel to a hot side of the second forward liner panel, and
         wherein the second liner panel side edge of the second forward liner panel is oriented non-perpendicular to the hot side of the second forward liner panel to direct cooling airflow from the cavity of the first forward liner panel to the hot side of the second forward liner panel.

2. The combustor of claim 1, wherein the liner panel forward edge and the liner panel aft edge are parallel.

3. The combustor of claim 1, further comprising:
   a second forward liner panel circumferentially adjacent to the first forward liner panel, the first forward liner panel and the second forward liner panel being in a spaced relationship forming a gap therebetween.

4. The combustor of claim 3, wherein the first forward liner panel is offset from the second forward liner panel to direct cooling airflow from a cavity of the first forward liner panel to the hot side of the second forward liner panel.

5. The combustor of claim 1, wherein the first liner panel side edge of the first forward liner panel is offset from the second liner panel side edge of the second forward liner panel to direct cooling airflow from the cavity of the first forward liner panel to the hot side of the second forward liner panel.

6. The combustor of claim 5, wherein the first liner panel side edge of the first forward liner panel is in a facing spaced relationship with the second liner panel side edge of the second forward liner panel defining the gap therebetween.

7. The combustor of claim 1, wherein the first liner panel side edge of the first forward liner panel is operably shaped to direct cooling airflow from a cavity of the first forward liner panel to the hot side of the second forward liner panel.

8. The combustor of claim 7, wherein the first liner panel side edge of the first forward liner panel is oriented non-perpendicular to a cold side of the first forward liner panel to direct cooling airflow from the cavity of the first forward liner panel to the hot side of the second forward liner panel.

9. The combustor of claim 1, wherein the first forward liner panel further comprises a side wall at the first liner panel side edge of the first forward liner panel, wherein the side wall further comprises cooling film orifices.

10. The combustor of claim 1, wherein the second forward liner panel further comprises a side wall at the first liner panel side edge of the second forward liner panel, wherein the side wall does not include cooling film orifices.

11. The combustor of claim 1, further comprising:
   an aft liner panel located aft of the first forward liner panel, wherein the aft liner panel is in a spaced relationship with the first forward liner panel forming a circumferential gap therebetween.

12. The combustor of claim 1, further comprising:
an aft liner panel located aft of the first forward liner panel, wherein the aft liner panel is integrally attached to the first forward liner panel to form a combined liner panel.

13. The combustor of claim 2, wherein the first liner panel side edge and the second liner panel side edge are linear in shape.

14. The combustor of claim 2, wherein the first liner panel side edge and the second liner panel side edge are curvilinear in shape.

15. A gas turbine engine, comprising:
a combustor comprising;
a forward liner panel comprising:
   a liner panel forward edge;
   a liner panel aft edge opposite of the liner panel forward edge;
   a first liner panel side edge between the liner panel aft edge and the liner panel forward edge; and
   a second liner panel side edge between the liner panel aft edge and the liner panel forward edge, the second liner panel side edge being about parallel to the first liner panel side edge,
      wherein the first liner panel side edge is non-perpendicular to the liner panel forward edge and oriented at an angle about perpendicular to a swirl flow in the combustor, and
      wherein the second liner panel side edge is non-perpendicular to the liner panel forward edge and oriented at an angle about perpendicular to the swirl flow in the combustor; and
a second forward liner panel circumferentially adjacent to the first forward liner panel, the first forward liner panel and the second forward liner panel being in a spaced relationship forming a gap therebetween,
wherein the second forward liner panel further comprises:
   a liner panel forward edge;
   a liner panel aft edge opposite of the liner panel forward edge of the second forward liner panel;
   a first liner panel side edge between the liner panel aft edge of the second forward liner panel and the liner panel forward edge of the second forward liner panel, wherein the first liner panel side edge of the second forward liner panel is non-perpendicular to the liner panel forward edge of the second forward liner panel and oriented at an angle about perpendicular to the swirl flow in the combustor, and
   a second liner panel side edge between the liner panel aft edge of the second forward liner panel and the liner panel forward edge of the second forward liner panel the second liner panel side edge of the second forward liner panel being about parallel to the first liner panel side edge of the second forward liner panel,
wherein the second liner panel side edge of the second forward liner panel is non-perpendicular to the liner panel forward edge of the second forward liner panel and oriented at an angle about perpendicular to the swirl flow in the combustor,
wherein the second liner panel side edge of the second forward liner panel is operably shaped to direct cooling airflow from a cavity of the first forward liner panel to a hot side of the second forward liner panel, and
wherein the second liner panel side edge of the second forward liner panel is oriented non-perpendicular to the hot side of the second forward liner panel to direct cooling airflow from the cavity of the first forward liner panel to the hot side of the second forward liner panel.

16. A forward liner panel for use in a combustor of a gas turbine engine, the forward liner panel comprising:
a liner panel forward edge;
a liner panel aft edge opposite of the liner panel forward edge; and
a first liner panel side edge between the liner panel aft edge and the liner panel forward edge,
wherein the first liner panel side edge is non-perpendicular to the liner panel forward edge and oriented at an angle about perpendicular to a swirl flow in the combustor,
wherein the first liner panel side edge of the first forward liner panel operably shaped to direct cooling airflow from a cavity of the first forward liner panel to a hot side of a second forward liner panel, and
wherein the first liner panel side edge of the first forward liner panel is oriented non-perpendicular to a cold side of the first forward liner panel to direct cooling airflow from the cavity of the first forward liner panel to the hot side of the second forward liner panel.

* * * * *